United States Patent

[11] 3,633,434

[72] Inventor Herbert J. Hoffman
Torrance, Calif.
[21] Appl. No. 22,316
[22] Filed Mar. 24, 1970
[45] Patented Jan. 11, 1972
[73] Assignee The United States of America as represented by the Secretary of the Air Force

[54] MIXTURE RATIO CONTROL
8 Claims, 2 Drawing Figs.
[52] U.S. Cl. .................................................. 74/470, 123/121
[51] Int. Cl. ................................................... G05g 1/00
[50] Field of Search ....................................... 74/470, 469, 471, 480, 479

[56] References Cited
UNITED STATES PATENTS
3,181,389 5/1965 Richard ...................... 74/480
3,330,477 7/1967 Stephens ..................... 74/479 X
3,530,736 9/1970 Houck ......................... 74/469

Primary Examiner—Milton Kaufman
Attorneys—Harry A. Herbert, Jr. and Jacob N. Erlich ABSTRACT: A mixture ratio control having a pair of valve arms attached to a rigid triangular-shaped member. A mixture ratio control actuator and a throttle actuator are also attached to the rigid member. Movement of the mixture ratio control actuator determines the vertical position of the pair of valve arms and therefore determines the flow through a pair of valves utilized in conjunction with the valve arms. After a setting of the mixture ratio control actuator, any subsequent movement of the throttle actuator moves the valve arms in a substantially straight line. Furthermore, throughout the entire throttle stroke the mixture ratio percentage flow through the valves remain constant.

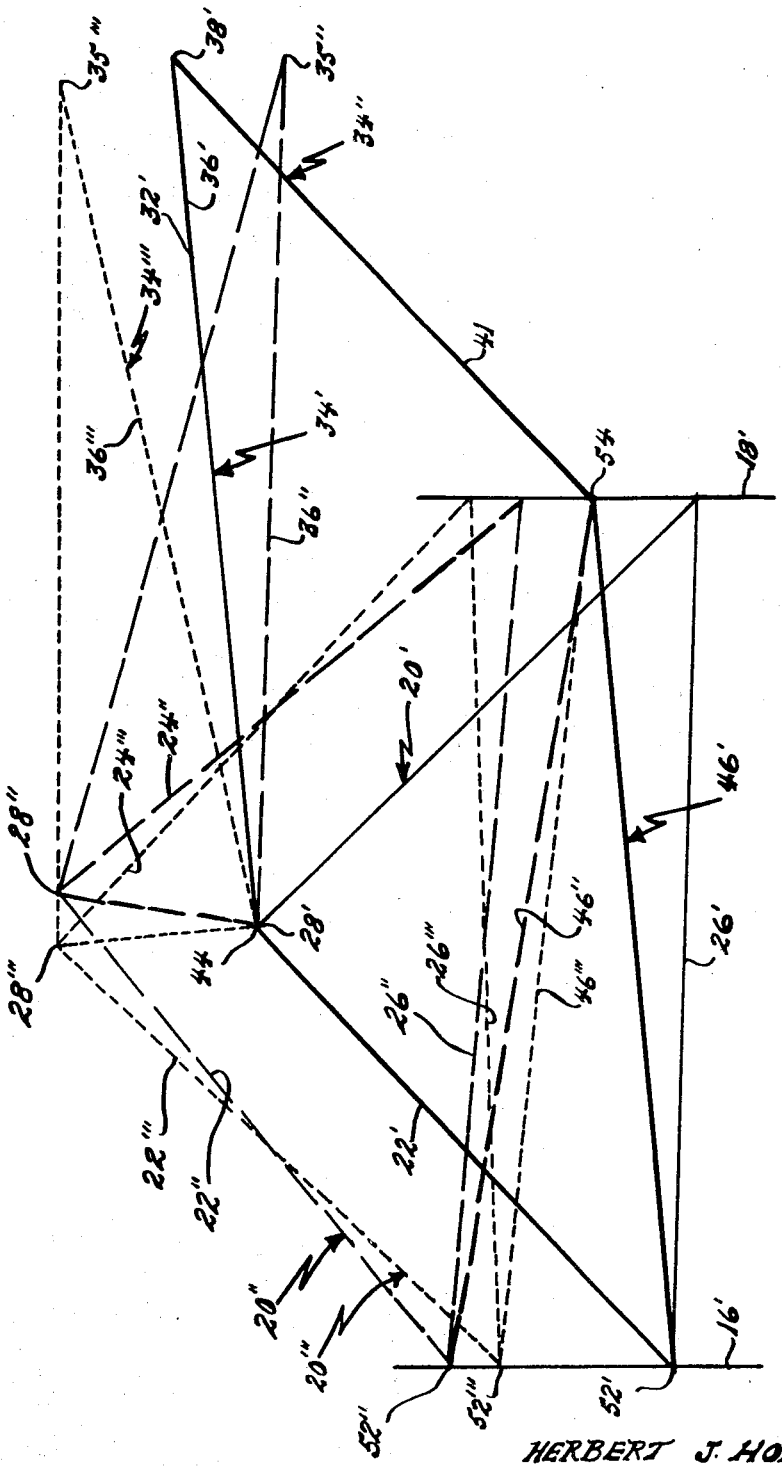

MIXTURE RATIO CONTROL

BACKGROUND OF THE INVENTION

This invention relates generally to valves, and more particularly to a control which is capable of adjusting the individual flows through a pair of valves.

Valves are primarily utilized to regulate the flow of a fluid in various machinery and piping systems. These valves, depending upon the accuracy needed in restricting flow, may be of the very simple type, such as stop valves or extremely complex in makeup. Another use for valves is in regulating the flow of liquid fuel and oxidizer chemicals from their tanks in a rocket or missile. In most instances, separate valves are employed in each propellant line. In the simplest case where the liquids are forced down to the combustion chamber by gas pressure and gravity, a diaphragm valve might be employed. In this arrangement the propellants are held back by a membrane or diaphragm in each valve until the pressure is great enough to burst them. Then the liquids flow into the combustion chamber where they burn until their supply is exhausted.

In the case of larger engines wherein variable thrust units are utilized, complex regulating valves are placed in each of the propellant lines. In this case the valves are used to regulate the flow rate and can be adjusted to provide the proper mixture ratio of the fuel and oxidizer for the most efficient engine operation. The production of such a valve is an art, especially where as in the rocket the slightest leak or inaccurate regulation of fuel and oxidizer may mean the difference between success and disaster. The fluids handled vary from innocuous operating gases, such as nitrogen or air, to boiling or corrosive liquids such as liquid oxygen and nitric acid. The operating conditions of these valves can be quite severe, that is ranging from fully closed to fully open in 10 or 20 milliseconds. With these variable thrust units special valves with mixture ratio controls are needed for throttling the propellants. Their makeup can become quite complex and expensive and as with all other components, weights and costs have to be kept down, but the passage design must still be smooth and efficient.

SUMMARY OF THE INVENTION

The instant invention sets forth a mixture ratio control for bipropellant flow control valves. The mixture ratio control of this invention is made up of a rigid triangular-shaped member with a throttle actuator attached at its apex. One leg of a semirigid flexure wishbone arrangement is also attached to the apex of the rigid triangular-shaped member; the other leg of the wishbone arrangement being fixed to a point substantially in the center of the rigid triangular member. The apex of the wishbone is connected to a mixture ratio control actuator. Each of the legs of the triangle are connected by a semirigid flexure arms to one of a pair of bipropellant flow control valves. One of the legs is also attached by a semirigid radius rod to a fixed point somewhat beyond the other leg.

In operation the mixture ratio control actuator is moved to a predetermined position. Upon actuation of the throttle actuator and because of the unique relationship between the rigid triangular-shaped member and the wishbone arrangement of the mixture ratio control of this invention, the pair of arms attached to each of the valves are moved in a substantially straight line and maintain a constant percentage of flow through the pair of valves at any throttle setting. All the joints of this invention are rigid and the motion is provided by the semirigid flat flexure members.

The key to the substantially straight line motion of the valve arms lies in the fact that the radius rod is identical in length to the legs of the wishbone arrangement and in the lowermost position of the triangular member a parallelogram is formed between the wishbone, the radius rod, one leg of the triangular-shaped member and a line connecting the fixed point of the radius rod to the apex of the wishbone.

It is an object of this invention to provide a mixture ratio control for use with a pair of valves which is of simple construction and extremely accurate in the operation of regulating flow through the pair of valves.

It is another object of this invention to provide a mixture ratio control which maintains at any flow setting a constant percentage of flow through each of a pair of valves.

It is still another object of this invention to provide a mixture ratio control which is of extremely durable construction.

It is a further object of this invention to provide a mixture ratio control which is an economical to produce and which utilizes conventional currently available materials that lend themselves to standard mass producing manufacturing techniques.

For a better understanding of this present invention together with other and further objects thereof, reference is made to the following description taken in connection with the accompanying drawing and its scope will be pointed out in the appended claims.

DESCRIPTION OF THE DRAWING

FIG. 2 of the drawing is a schematic diagram of various positions of the mixture ratio control of this invention.

DESCRIPTION OF THE PREFERRED EMBODIMENT

Figure 1:
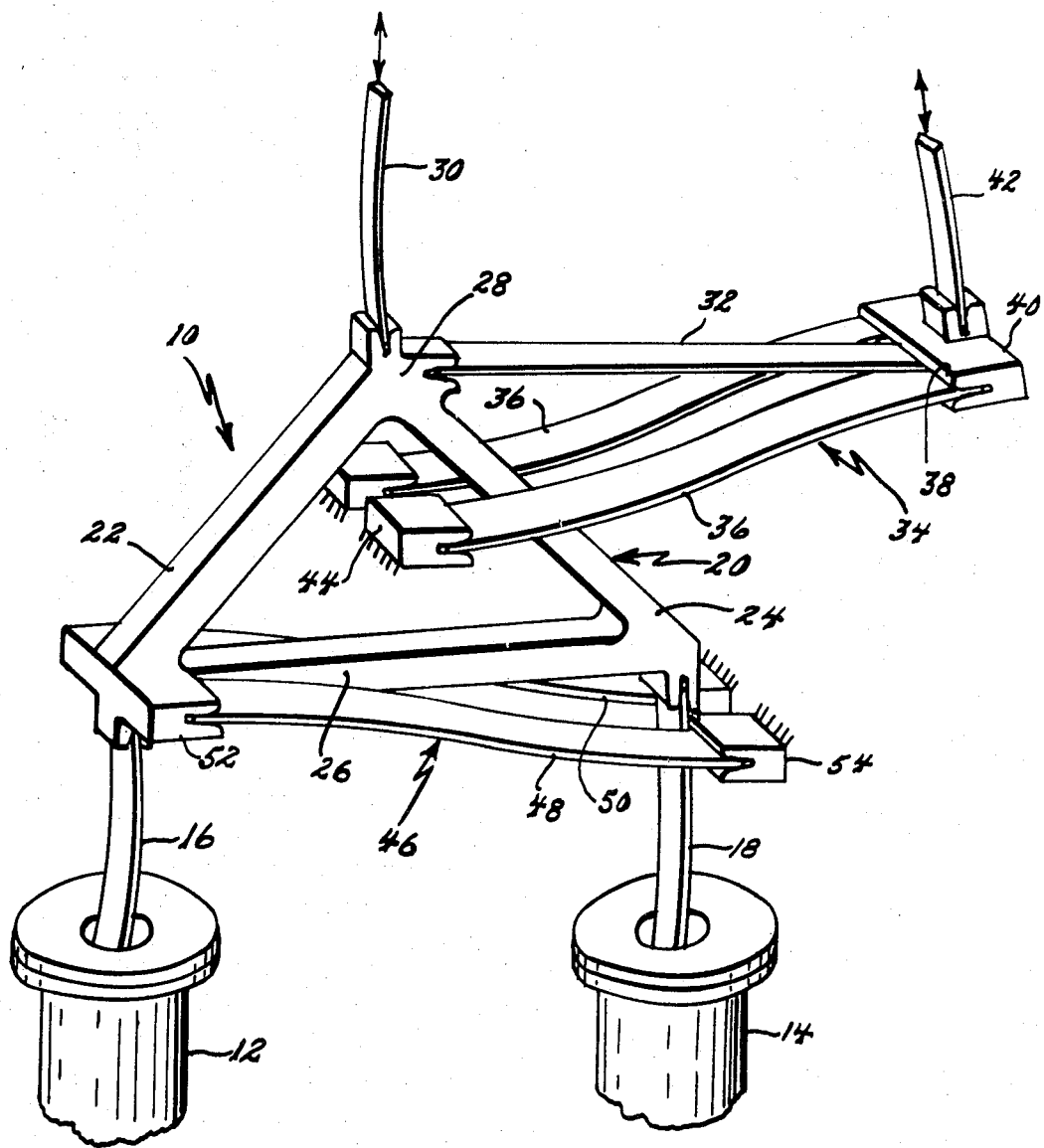
FIG. 1 of the drawing is a pictorial view of the mixture ratio control of this invention.

Referring now to FIG. 1 of the drawing, the mixture ratio control 10 of this invention is shown with a pair of valves 12 and 14. These valves 12 and 14 are of any conventional design and are regulated by the vertical movement of the semirigid valve arms 16 and 18, respectively.

The mixture ratio control 10 is made up of a rigid triangular member 20 having legs 22 and 24, and base 26. Member 20 has attached thereto at its apex 28 a throttle control actuator 30 and the upper leg 32 of a wishbone arrangement 34. The wishbone arrangement 34 is made up of a plurality of semirigid legs; upper leg 32 and a pair of lower legs 36 held together at its apex 38 by any conventional rigid joint 40. As pointed out previously, upper leg 32 is fixedly secured at one end thereof to apex 28 of rigid member 20 and has fixedly secured to its other end at rigid joint 40 a mixture ratio control actuator 42. The bottom or lower legs 36 are secured at one end to a fixed point 44 and at the other end to the mixture ratio control actuator 42.

Referring once again to the rigid triangular member 20, the lower end of one leg 22 is secured to the semirigid valve arm 16, while the other leg 24 is secured at its lower end to the other semirigid valve arm 18. A radius rod 46, being made up preferably of a pair of semirigid lower legs 48 and 50, is secured at one end to a conventional rigid joint 52 and at the other end to a fixed point 54.

As shown in FIG. 1, the lowermost legs 36 of the wishbone arrangement 34 have a space therebetween in order to allow the passage of one leg 24 of the rigid triangular-shaped member 20 therethrough. It should be noted, however, that any other type configuration may be utilized in place of the pair of legs 36 as long as the resultant operation of the mixture ratio control 10 of this invention is not adversely affected. The radius rod 46 is also of the split leg configuration and can also be made of any other configuration which will allow for the passage therethrough of valve arm 18 and base 26.

The initial or inoperative position of the mixture ratio control 10 is best shown by the solid lines shown in FIG. 2. In this inoperative position all the elements of the mixture ratio control 10 will be denoted by the identical numerals utilized with reference to FIG. 1, with the addition of a prime (') thereafter.

As shown in FIG. 2, in the inoperative position, the legs 36' and 32' of the wishbone arrangement 34' are in the same position. For proper operation of the mixture ratio control 10 of this invention the length of the legs of wishbone 34' must be identical to the length of the radius rod 46'. Furthermore, in the inoperative position, shown in FIG. 2, wishbone 34', one leg 22' of the triangular-shaped member 20', the radius rod 46', and a line 41 drawn between point 54 and point 38' must be in the form of a parallelogram. In this lowermost position, shown in FIG. 2, the valve arms 16' and 18' are also in their lowermost position and therefore in the off position of valve operation.

As the throttle actuator 30 shown in FIG. 1 is raised, the rigid triangular-shaped member 20 is also accordingly raised from the position shown in FIG. 2 to the position shown in FIG. 1. In the position shown in FIG. 1, base 26 of the triangular-shaped member 20 remains parallel to its initial position represented by base 26' in FIG. 2. This operation raises valve arms 16 and 18 in a substantially straight line to the open position.

The rigid triangular-shaped member 20 is shown in two of its many operative positions in FIG. 2; one of the positions being represented by the long dashed lines and will hereinafter have its elements denoted by a double prime ('') thereafter. The other position shown in FIG. 2 is represented by the short dashed lines and will hereinafter be denoted by numerals having a triple prime (''') thereafter.

The various positions of the rigid triangular-shaped member 20 of the mixture ratio control 10 of this invention are determined by the position of the mixture ratio control actuator 42 in conjunction with the movement of throttle actuator 30. Because of the unique relationship between the various elements of the mixture ratio control 10 of this invention, the resultant movement of the valve arms 16 and 18 is in a substantially straight line. This substantially straight line motion of valve arms 16 and 18 will remain even though the apex of the wishbone 28 is moved to various positions such as shown at 28'' and 28''' in FIG. 2. Furthermore, the percentage of valve opening will remain constant for both valves 12 and 14 throughout the entire upward or downward movement of the throttle actuator 30 as long as the mixture ratio actuator 42 remains fixed at a predetermined position such as point 35'' or 35''', or any position therebetween.

MODE OF OPERATION

In operation the mixture ratio control 10 of this invention is utilized in conjunction with a pair of valves 12 and 14 which form part of, for example, the fuel and oxidizer valve system of a rocket engine. In any device in which it is necessary for a fixed proportion of fluid to flow through a pair of valves, and especially in a rocket where it is of the utmost importance to regulate the flow rate through these valves, it becomes essential to use a highly efficient mixture ratio control.

The valves 12 and 14 are in the fully closed or off position when the mixture ratio control 10 has its rigid triangular-shaped member 20' in the down position as shown in FIG. 2. The valves 12 and 14 can be opened by the upward movement of the throttle actuator 30 (shown in FIG. 1).

Referring once again to FIG. 2, the apex 28' of the rigid triangular-shaped member 20' is in a position which corresponds to zero thrust and always returns to this position regardless of the mixture ratio control actuator setting. The wishbone 34', the radius rod 46' and the rigid triangle 20' form a four bar linkage which provides substantially straight line motion of the semirigid valve arms 16' and 18' within the valves 12 and 14, respectively. Throughout this substantially straight line motion of valve arms 16' and 18', there is a constant mixture ratio in percentage from the minimum to the maximum throttle setting. The extremes of the mixture ratio adjustment are shown by the triangle formed by the lines connecting points 28', 28'', and 28'''. These extremes correspond to the mixture ratio control actuator positions 35'' and 35'''.

For example, if the selected adjustment by the mixture ratio control actuator 42 is at 35''', then the apex 28' of the rigid triangular member 20' is constrained to move along a line between points 28' and 28''' as the throttle actuator 30 is moved from its closed position at 28' to its fully opened position at 28'''. As the throttle actuator 30 is moved, the mixture ratio through valves 12 and 14 is maintained throughout this movement at a constant percentage of flow, dictated by the throttle setting.

It is therefore possible with the mixture ratio control 10 of this invention to initially set the predetermined percentage of flow through each of the valves 12 and 14 by the proper regulation of mixture ratio control actuator 42 and then, by the subsequent movement of the throttle actuator 30, the flow through these valves will increase; however, the percentage of flow through valves 12 and 14 will always remain constant. Furthermore, the use of a radius rod 46 equal in length to the wishbone 34 and the formation of the parallelogram between points 38', 28'. 52'. 54 and 38', while the mixture ratio control 10 is at its lowermost position, allows for the substantially straight line movement of valve arms 16 and 18 throughout any throttle actuator setting.

Although this invention has been described with reference to a particular embodiment, it will be understood to those skilled in the art that the invention is also capable of a variety of alternate embodiments within the spirit and scope of the appended claims.

I claim:

1. A mixture ratio control comprising a triangular-shaped rigid member having a pair of legs and a base, first means for moving said triangular-shaped rigid member in a substantially vertical direction, second means for moving the apex of said rigid member in a substantially horizontal direction, a first valve arm fixedly secured to the lower end of one of said legs of said rigid member, and a second valve arm fixedly secured to the lower end of the other one of said legs of said rigid member, whereby movement of said second means and subsequent movement of said first means results in the substantial vertical movement of each of said pair of valve arms.

2. A mixture ratio control as defined in claim 1 wherein said second means comprises of at least two semirigid legs connected together at one end thereof, the other end of one of said semirigid legs being fixedly secured to the apex of said triangular-shaped rigid member and the other end of said other of said semirigid legs being secured to a fixed point.

3. A mixture ratio control as defined in claim 2 further comprising a radius rod, said radius rod being fixedly secured at one end thereof to the lower end of one of said legs of said rigid member and at the other end thereof to a fixed point.

4. A mixture ratio control as defined in claim 3 wherein said radius rod and one of said semirigid legs are the same length.

5. A mixture ratio control as defined in claim 4 wherein said first means for moving said triangular-shaped rigid member is fixedly secured to said triangular-shaped rigid member at the apex thereof.

6. A mixture ratio control as defined in claim 5 wherein said one end of said radius rod and said first valve arm are fixedly secured to said triangular-shaped member at the same point.

7. A mixture ratio control as defined in claim 6 wherein said second means is made up of three semirigid legs.

8. A mixture ratio control as defined in claim 7 wherein said radius rod is made up of a pair of semirigid legs.

* * * * *